Figure 1:
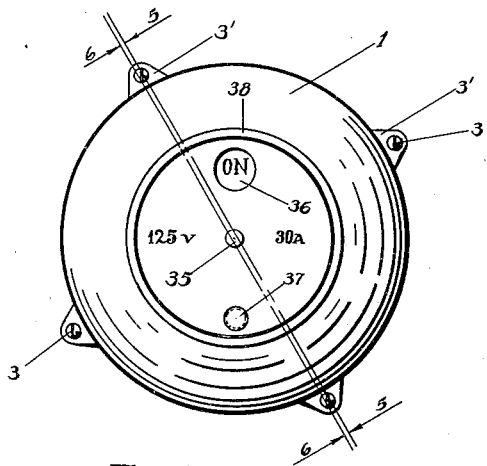

July 25, 1933.   S. S. GREEN   1,920,034
CONTROLLER FOR ELECTRIC CIRCUITS
Filed Jan. 26, 1931   2 Sheets-Sheet 1

Stanley S. Green. INVENTOR
BY Henry P. Bright
ATTORNEY

July 25, 1933.  S. S. GREEN  1,920,034
CONTROLLER FOR ELECTRIC CIRCUITS
Filed Jan. 26, 1931   2 Sheets-Sheet 2

Stanley S. Green. INVENTOR
BY Henry T. Bright
ATTORNEY

Patented July 25, 1933

1,920,034

UNITED STATES PATENT OFFICE

STANLEY S. GREEN, OF LA FAYETTE, INDIANA, ASSIGNOR TO DUNCAN ELECTRIC MANUFACTURING COMPANY, OF LA FAYETTE, INDIANA, A CORPORATION OF ILLINOIS

CONTROLLER FOR ELECTRIC CIRCUITS

Application filed January 26, 1931. Serial No. 511,382.

My invention relates to controllers for electric circuits of the type disclosed in my copending application Serial Number 285,114, filed June 13, 1928, and in said application the general structure disclosed in this present application is claimed in its broadest aspects. In my said copending application I have disclosed an electric circuit controller which is inclusive of a body of electric current conducting material, such as mercury, that is normally contained in the bore or passage of a conduit made of insulating material. This current conducting liquid serves to electrically connect two electrodes of the associated circuit, when the device is in circuit closing position. When there is an abnormal flow of current through the device, the liquid conductor, or a sufficient portion of it, is expelled to break the electrical connection between the electrodes and thereby open the circuit and guard the translating device within the circuit. The liquid conductor and associated electrodes and parts thus constitute a circuit-protecting switch.

My present invention has for its general objects the formation of a switch structure which is simple and yet strong enough to withstand the violence which attends its operation, the provision of a great resistance to flash-over within the switch to minimize destructive arcing, provision of a simple and rugged support for the circuit-controlling element within a housing enclosing the structure, the attainment of a construction and relation of parts which will lend themselves to easy and economical quantity production, and the provision of a method of connecting the switch to the circuit by supporting means inclusive of sliding or rubbing contacts to allow the desired movement of the switch between "on" and "off" positions. A further object is to make the circuit controller and its supporting means so that one or more of them can be readily mounted in the common type of metal switch box or assembled in the usual distribution panelboard enclosure. An additional object is to provide a simple "on" and "off" indicator for the circuit controller.

In carrying out my invention, I reenforce the conduit of insulating material with a metallic shell and clamp it firmly in spaced interior relation to the container. I desirably provide such container in the form of two mating shells or cups of insulating material clamped together with a sealing material therebetween and arranged to be imperforate to the outer air. The reenforcing and supporting shell on the conduit of insulating material desirably has a relative shape and spacing and is so insulated with respect to the electrodes and liquid conductor in the conduit therebetween as to provide a relatively great flash-over resistance for the controlled current around the conduit and through the reenforcing shell or support thereof. Slidable mounting means is provided for the housing enclosing the circuit controller which not only rotatably supports the same, but provides lead-in and lead-out connections for the controlled current in such a way that such current cannot be interrupted except within the switch housing. A base for the housing and slidable mounting means is provided which adapts the entire assembly for inclusion in a metal box or for use as a unit in a distribution panelboard. On the front of the circuit-controller housing is mounted a counter-weighted disc having a window therein. This disc is rotatable and occupies different relative positions with respect to the housing as the housing is rotated. Thus the words "on" and "off" can be read through the disc window when the housing occupies such respective positions.

Figure 2:
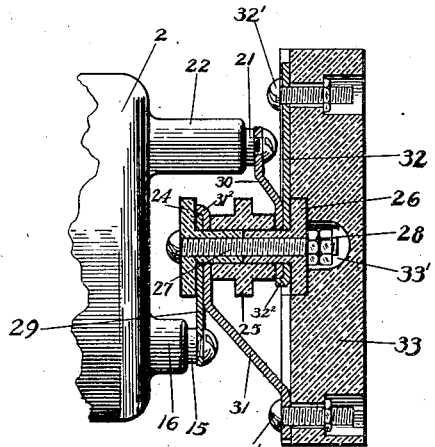
Figure 3:
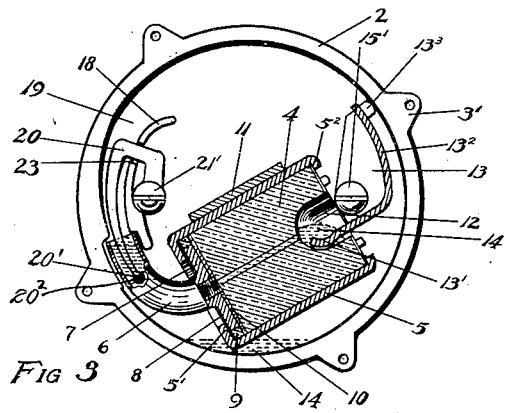
Figure 4:
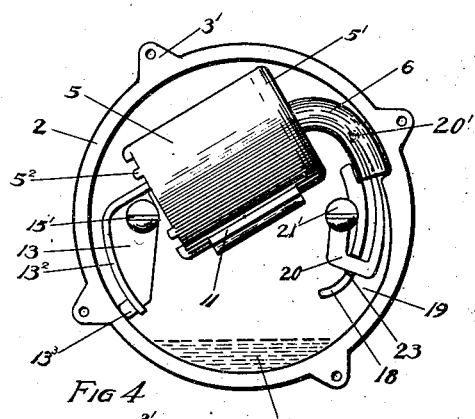
Figure 5:
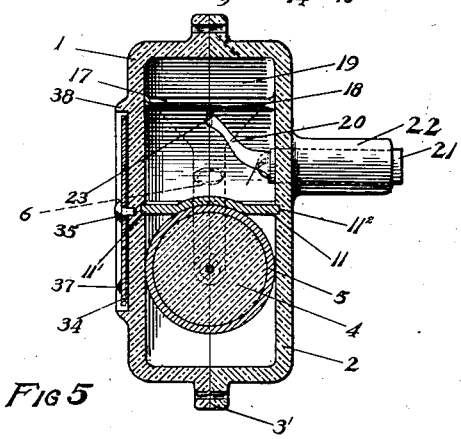
Figure 6:
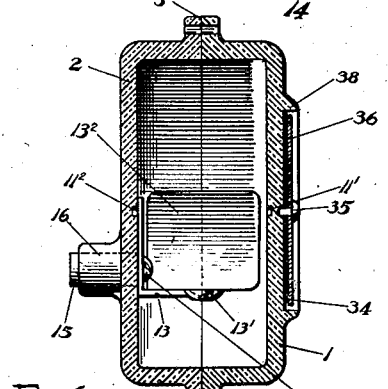
Figure 7:
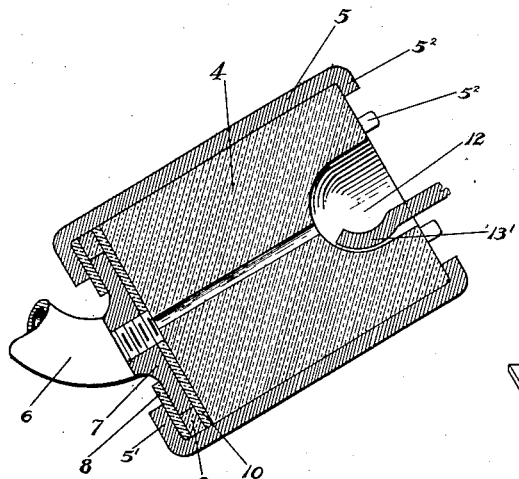
Figure 8:
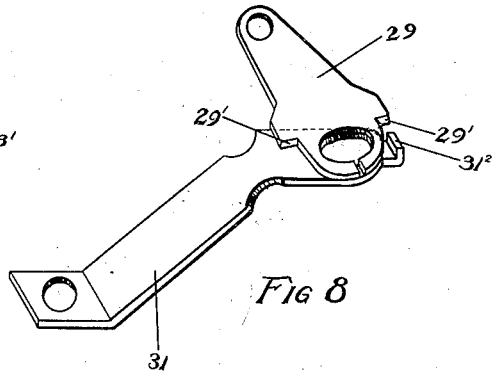
Figure 9:
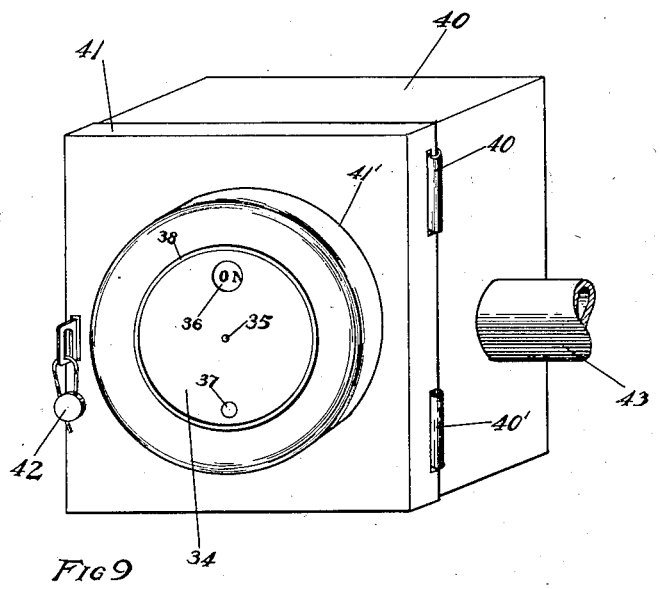

The invention has other characteristics that will be more fully explained in connection with the accompanying drawings, in which Figure 1 is a front elevation of the circuit controller, exclusive of its mounting and base, in the "normal on" position;

Figure 2, a fragmentary side elevation of the circuit controller in a position intermediate between the "on" and an "off" position, part of the supporting base being in section;

Figure 3, a front elevation, partially in section, of the circuit controller casing in the "on" position, the front section of such casing being omitted for the purpose of showing interior parts;

Figure 4, a view, somewhat similar to Figure 3, but showing the controller casing in its "off" position and illustrating parts in elevation that appear in section in Figure 3;

Figure 5, a section on the line 5—5 of Figure 1 of the circuit controller casing only;

Figure 6, a section on the line 6—6 of Figure 1 of the circuit controller casing only;

Figure 7, a fragmentary section of the control tube assembly on an enlarged scale;

Figure 8, a detail view of one pair of sliding contact connectors by which the circuit controller casing is supported and connected in circuit; and Figure 9, a perspective view of one of the circuit controllers mounted in a cabinet.

In the forms of the invention illustrated, the casing is moulded of insulating material and is inclusive of the front half or removable cup-shaped section or shell 1 and the rear half or removable cup-shaped section or shell 2. These casing sections are clamped snugly together as by means of the metallic bolts 3 which pass through external ears 3′ formed on the casing section. The pressure exerted by said bolts is sufficient to bring the engaging flat faces of the casing sections into intimate contact so that the casing is imperforate in this region and throughout the entire circumference of the casing which is desirably cylindrical. A film of cement such as bakelite varnish, is desirably applied to these flat surfaces before placing them together and tightening bolts 3. The circuit controlling element is within the casing and is operable to "on" and "off" positions by suitably moving the casing. This circuit controlling element includes as shown in the embodiment of the invention illustrated, a control tube 4, preferably of porcelain produced by the wet process. This tube is surrounded by a reenforcing metal jacket 5 that is preferably of iron and is initially of smaller internal size than the portion of the conduit it surrounds. Jacket 5 is preferably formed from sheet metal as by drawing and then pressed into position over tube 4.

A feed tube 6, preferably of metal, communicates with one end of the bore of tube 4. At the end adjacent tube 4, one end of this feed tube is fastened, as by threads to a flange 7. Flange 7 is electrically insulated from jacket 5 by means of insulating washers 8, 9 and 10, preferably formed of a heat resisting insulation such as asbestos paper or asbestos pressboard. Such insulating washers may be impregnated with a heat resisting compound or binder, such as bakelite varnish, if desired. Flange 7 and its insulating washers 8, 9 and 10 are positioned in the bottom of jacket 5 and tube 4 is forced into the jacket. At its end adjacent the tube 6, the jacket 5 has a rim 5′. When tube 4 is forced into the jacket, flange 7 together with its insulating washers is held tightly between such rim 5′ and tube 4. Fingers 5² on the normally upper part of jacket 5 are then bent over around the end of tube 4 to hold it in place. Feed tube 6, conduit 4, and jacket 5 are in this way made as one integral assembly. Liquid conductor is adapted to be fed to conduit 4 through the strong non-shatterable metal feed tube 6, and conduit 4 is also strengthened and made non-shatterable by the metal reenforcement of jacket 5, the rim 5′ of jacket 5, flange 7 and fingers 5². It will be apparent from this novel construction that although the controlling element, including the feed tube and porcelain conduit is substantially metal-clad throughout, feed tube 6 is completely insulated electrically from jacket 5 and thereby prevents flash-over of the controlled current along a path outside of porcelain tube 4 and inclusive of metal jacket 5. If desired, an insulating varnish or paint can be applied to the outside of feed tube 6, the exposed end portion of flange 7 and the outside of jacket 5 to make this insulating construction still more effective, although such additional precaution is not essential.

On the outside of jacket 5 is fastened securely, as by spot-welding, a transverse metal support piece 11. The ends of this piece nest snugly into recesses 11′ and 11² provided therefor in the respective front and rear casing halves. This support positions the current-controlling unit comprising tube 4 securely and accurately in the housing independent of any other means for support. The heat and arcing attendant to operation are localized within tube 4 and spaced a substantial distance from the walls of the container by this construction.

The end of the bore of the conduit 4 remote from the tube 6 is enlarged to form a well 12 adapted to receive the tip 13′ of a metallic electrode 13 which contacts with the mercury 14, or other liquid conductor contained in the conduit bore, and the well enlargement 12 when the device is in circuit closing position. Slight clearance desirably intervenes between the wall of well 12 and the electrode part 13′. Electrode 13 is fastened in position upon a metallic lead-in stud 15 by a screw 15′ threading into the inner end of this stud. A boss 16 constituting a part of casing section 2 is securely moulded about the knurled end of stud 15 which passes through to the exterior of the casing. The curved end 13′ of the metallic electrode 13 has sufficiently full contact with the liquid conductor in the well 12 without substantially obstructing the free passage of the liquid conductor and gas rapidly escaping from the conduit bore upon severe short circuit. A portion of the electrode 13 is formed to constitute a barrier $13^2$ to protect the casing wall from the explosive effects of the hot mercury or liquid conductor and the vapor thereof that are ejected violently from the conduit bore upon short circuit. This liquid conductor vapor and the attendant arc of high temperature might otherwise strike the casing wall forcibly with injurious effect. Said shield or barrier $13^2$ also absorbs much of the heat contained in the liquid conductor and vapor striking it since being a metal it has a relatively large heat absorbing capacity that acts to condense the liquid conductor vapor and has a marked effect in quenching any arc which might arise between the electrode 13 and other parts of opposite electrical polarity in the casing. A small extension $13^3$ on electrode 13 is shaped to touch the casing and thus position it and prevent the entire electrode 13 from tending to turn about screw 15' upon explosive impact of mercury vapor against it on short circuit. Electrode 13 is preferably made of copper or other metal of high electrical and thermal conductivity but plated with a mercury-resisting substance such as iron or nickel. The other metals exposed in the container to the action of mercury or mercury vapor may also be made out of non-ferrous metal such as copper, if that metal is coated with iron or other mercury resistant metal.

Mating projections 17 and 18 are respectively integrally moulded with the casing sections 1 and 2, and form with contiguous portions of the casing a funnel-shaped space 19. The receiving end of the feed tube 6 farthest from conduit 4 may be freely received within the stem of the funnel to virtually constitute a continuation thereof. A considerable degree of clearance between the stem of feed tube 6 and the lower end or stem of funnel 19 is, however, desirable in order to provide a tolerance which in manufacture will insure both halves of the casing going together without being prevented by the end of feed tube 6 in the stem of the funnel 19. I have found a clearance on all sides of the feed tube of approximately .010″ satisfactory for this purpose giving a diameter of funnel stem approximately .020 greater than the diameter of feed tube 6.

Another electrode 20 is provided to dip into the liquid conductor in the feed tube and thus make electrical connection through the liquid conductor in the feed tube and the bore of conduit 4 with the electrode 13. Such electrode 20 is conveniently punched from sheet metal and is supported upon another lead-in stud 21 by means of a screw 21' threading into the interior end of this stud. Lead-in stud 21 is knurled and is cast into and passes through the casing half 2 in the same manner as its companion lead-in stud 15 and has around it a boss 22. Electrode 20 passes through a small slot 23 in the interior portion of the wall of the funnel space 19 and has a tip 20' which dips a substantial distance into and below the level of the liquid conductor in feed tube 6 when the liquid conductor is at a normal level in such tube in the normal "on" position of the device as shown in Fig. 3. The bore of feed tube 6 is made large enough to admit such electrode tip 20' with clearance all around it to allow for free passage of the mercury into and out of the tube. The tip 20' is provided with a small hole $20^2$ passing through it transversely through which a small steel pin may be passed and anchored into the side walls of fed tube 6 after electrode tip 20' is inserted in place therein. This is for the purpose of preventing electrode 20 from being blown out of the feed tube 6 by the violent passage of mercury therethrough upon severe short-circuit conditions.

Conduit 4 and feed tube 6 are so positioned with respect to the casing that when the device is turned from "on" to "off" position, the mercury will be discharged therefrom into the surrounding space and open the circuit, the liquid conductor falling to the then bottom of the casing as indicated at 14 in Fig. 4. When the device is turned from "off" to "on" position, the cup of funnel 19 will gather most of the liquid conductor at 14, this gathered liquid passing by gravity through the cup and stem of the funnel into the feed tube 6, and thence to the bore of conduit 4 and well 12, whereby the circuit is closed. In the event the liquid conductor vaporizes while the controller is "on" with resulting interruption of the circuit, it is only necessary to operate the controller successively to "off" and "on" positions when the liquid conductor will be returned to the tube 6 and conduit 4 and the circuit reestablished without the renewal of any parts. To insure closure of the circuit, I provide an excess of mercury or liquid conductor which finds lodgment in the then bottom of the casing as indicated at 14 in Fig. 3, this excess flowing from the well 12 when the device has been fully brought to its "on" or circuit closing position. When the device is in the "on" position and the control circuit is closed at a lamp or other translating device, the circuit is inclusive of lead-in stud 21, electrode 20, and electrode tip 20', the mercury in the bore of feed tube 6, the mercury in the bore of conduit 4 and well enlargement 12, electrode tip 13', electrode 13 and thence to lead-in stud 15.

A mounting device not only supports the housing but provides a path for controlled current into and out of the housing. Three insulating members, preferably of moulded material, 24, 25, and 26, are clamped together on a bolt 27 secured at one end by nuts 28. Between these insulating members are clamped radial connectors 29 and 30 connecting to studs 15 and 21. Connecting straps 31 and 32 are also clamped between said insulating members 24, 25, and 26. The ends of connecting straps 31 and 32 are fastened to an insulating base 33 by screws 31' and 32' which also serve to fasten the wires which may lead to the circuit to be controlled. The base 33 may be recessed as at 33' in order to receive a portion of the insulating member 26.

The casing may be moved through approximately 180 degrees to its "on" and "off" position and in so doing sliding electrical contact is maintained between radial connector 29 and connecting strap 31 in one case and between radial connector 30 and connecting strap 32 in another case. Stops 31² and 32² are provided on connecting straps 31 and 32 to engage corresponding projections such as 29' on radial connectors 29 and 30 to limit the range of motion of the device. This construction is clearly disclosed in Figure 8 which shows in detail one pair of supplementary sliding connectors, namely, radial connector 29 and strap connector 31 together with its stop 29' and the supplementary projection 31' on radial connector 29.

The swivel mounting construction shown spaces the lead-in conductors from the circuit to be controlled into the circuit breaker housing a proper distance, allows suitable sliding contact while the housing is being moved from one position to another and also supports the housing effectively and simply.

A disc 34 is mounted on a pin 35 on the face of the housing. A window 36 is formed in this disc and diametrically opposite such window is placed a small counter weight 37, such as a lead button. When the casing is rotated, the disc 34 is free to assume a position such that the lead counter weight 37 is always at the bottom. The word "on" is placed on the casing in such a position that it is observable through the window of the disc when the controller is in its "on" position. In Figure 1, such word "on" is shown thus visible. Similarly the word "off" may be placed upon the casing in a proper position to be observable through said window when the controller has been operated to its "off" position. A bead or rim 38 is raised in circular formation around the periphery of the disc 34 in order to protect the same from being disturbed or removed inadvertently from the casing face. Name plate data may be printed on the disc 34, if desired.

It is evident that the complete assembly of base, carrier and circuit controller constitutes a complete circuit breaker device capable of switching the controlled circuit on and off and in addition having a predetermined current-carrying capacity beyond which the circuit is automatically opened but may be reclosed manually without the renewal of any of its parts. Such a circuit breaker device can be used in many ways and if desired can be mounted in the ordinary type of metal switch box so that all wires to and from it can be completely enclosed and metal-clad. A particular adaptation of the present form of mounting would be in connection with such forms of metal-clad switch housings as are described in my copending application No. 463,174 filed June 23, 1930, wherein a liquid conductor circuit controller somewhat similar to the present described controller but with a different form of mounting is described in use with a metal box or cabinet to form a meter entrance switch. As an example of how the present switch and method of mounting can be applied to applications where a box or cabinet is employed, reference is made to Figure 9 which shows an enclosing box or housing 40 having a cover 41. Within this box is mounted the casing and its base. A hole 41' is cut in the cover of the box through which the face of the casing may extend and be accessible to grasp manually and turn to the "on" or "off" position. The cover of the box 40 may be hinged as at 40' and be provided with a seal assembly 42 by which unauthorized persons may be kept from undetectably having access to the box. A conduit 43 is shown fastened to one side of box 40 through which one or more wires for connection to the circuit controller may pass.

The circuit breaker device assembled with an enclosing cabinet as in Fig. 9 renders the circuit breaker manually operable by using the body of the casing 1, 2, as a handle from the exterior of the cabinet without the necessity of tampering with anything within the cabinet or even of opening the cover.

I claim:

1. An electric circuit controller including, an insulating casing, liquid conductor carried in said casing, a control unit in said casing including a dielectric current limiting control tube having a metallic feed tube associated therewith and a metallic jacket which reinforces said control tube and secures said feed tube thereto, a pair of electrodes arranged to be connected by liquid conductor in said control unit when the controller is on, the first of said electrodes being associated with said feed tube and the second of said electrodes being at the other end of said control tube and therefore near said reinforcing jacket, said control unit being constructed to vaporize said liquid conductor and discharge it into said container under the influence of excess current, said container being substantially sealed to confine any discharged vapor therewithin where it contacts with said electrodes and other metallic parts, said metallic jacket being insulated from said metallic feed tube and from both electrodes to minimize the chance of arcing between said jacket and said second electrode.

2. An electric circuit controller including a casing, a tubular conduit in the casing, liquid conductor carried in the conduit when the controller is "on" and discharged therefrom into the casing as the controller is operated to "off", electrodes adapted to be connected by the liquid conductor in the conduit when the controller is "on", said conduit including metallic and dielectric sections, and means joining the sections including a single metallic member carried by the dielectric section and engaging a surface thereof facing away from said metallic section, and insulation interposed between said member and the metallic section.

3. An electric circuit controller of the volatilizing cut-out type including a casing, a tubular conduit in the casing, a volatilizing liquid conductor carried in the conduit when the controller is "on" and discharged therefrom into the casing as the controller is operated to "off", electrodes adapted to be connected by the liquid conductor when the latter is disposed in the conduit, said conduit including a metallic section and a dielectric section in which latter volatilization of liquid conductor is initiated by excessive current to open the circuit while the controller is "on", and means joining the sections including a metallic member and insulation interposed between said member and said metallic conduit section, said member also constituting a reenforcing jacket for the dielectric section and engaging a surface thereof facing away from said metallic section.

4. An electric circuit controller of the volatilizing cut-out type including a casing, a tubular conduit in the casing, a volatilizing liquid conductor carried in the conduit when the controller is "on" and discharged therefrom into the casing as the controller is operated to "off", electrodes adapted to be connected by the liquid conductor when the latter is disposed in the conduit, said conduit including a metallic section and a dielectric section in which latter volatilization of liquid conductor is initiated by excessive current to open the circuit while the controller is "on", and means joining the sections, said means including a metallic reinforcing jacket surrounding the dielectric section and having one end inturned and spaced from the adjacent end of said section, an enlarged terminal on the metallic section extending between the inturned end of the jacket and the dielectric section, and insulation interposed between said enlarged terminal and all parts of the reinforcing jacket.

5. An electric circuit controller including a casing, a strut within and supported by opposite walls of the casing, a tubular conduit fixed to and supported by said strut, liquid conductor carried by the conduit when the controller is "on" and discharged therefrom and returned thereto as the controller is successively operated from "on" to "off" and from "off" to "on", and electrodes adapted to be connected by liquid conductor when the latter is disposed in the conduit.

6. An electric circuit controller including a dielectric casing, a metallic strut within and supported by opposite walls of the casing, a tubular conduit having a metallic outer face welded to said strut whereby the latter supports the conduit within the casing, liquid conductor carried by the conduit when the controller is "on" and discharged therefrom and returned thereto as the controller is successively operated from "on" to "off" and from "off" to "on", and electrodes adapted to be connected by liquid conductor when the latter is disposed in the conduit.

7. An electric circuit controller including, an insulating casing, liquid conductor carried in said casing, a control unit in said casing including a dielectric current limiting control tube having a metallic feed tube associated therewith and a metallic jacket which reinforces said control tube and secures said feed tube thereto, a pair of electrodes arranged to be connected by liquid conductor in said control unit when the controller is on, the first of said electrodes being associated with said feed tube and the second of said electrodes being at the other end of said control tube and therefore near said reinforcing jacket, said control unit being constructed to vaporize said liquid conductor and discharge it into said container under the influence of excess current, said container being substantially sealed to confine any discharged vapor therewithin where it contacts with said electrodes and other metallic parts, said metallic jacket being insulated from said metallic feed tube and from both electrodes to minimize the chance of arcing between said jacket and said second electrode, and being flanged inwardly at one end around an enlarged terminal of said feed tube and being flanged inwardly at its other end around a shoulder of said control tube.

STANLEY S. GREEN.